Nov. 17, 1931.   J. F. LEVAN   1,832,225
WEATHER STRIP
Filed Oct. 6, 1928
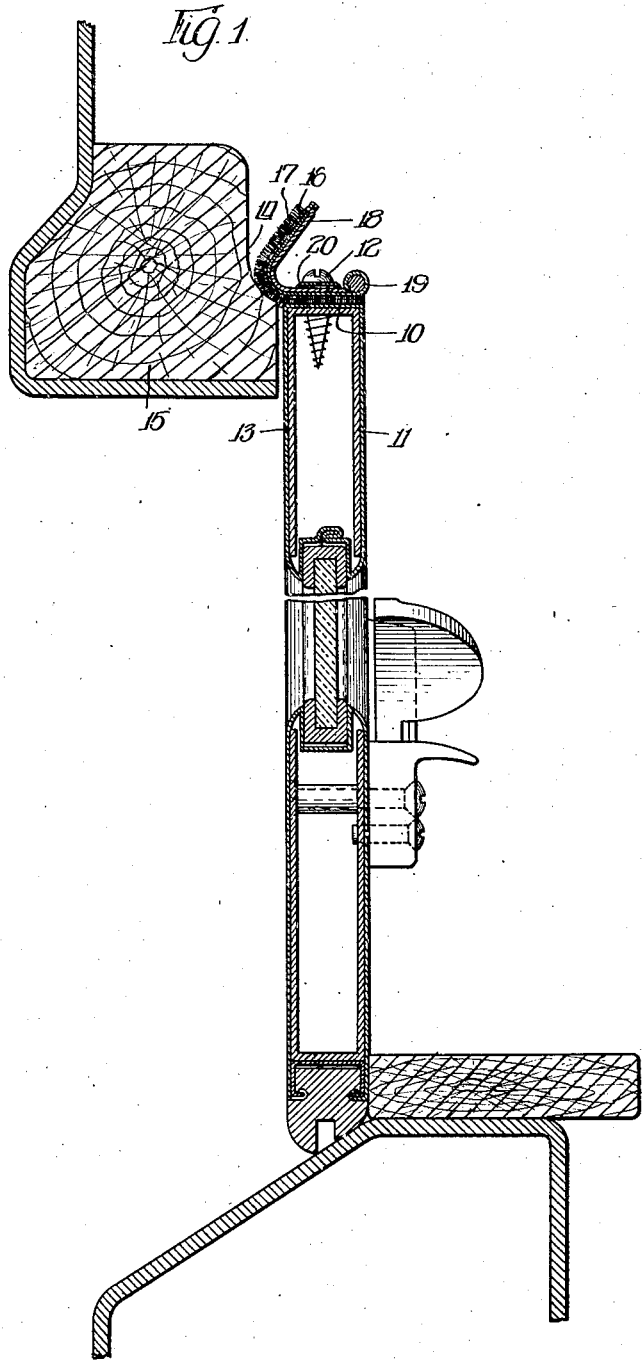
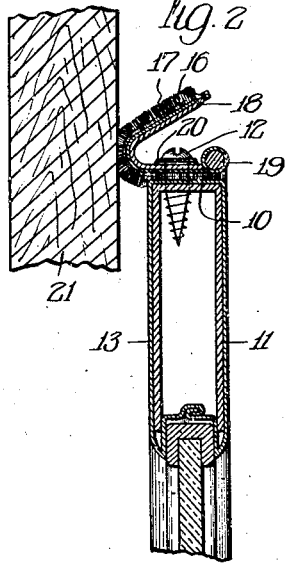
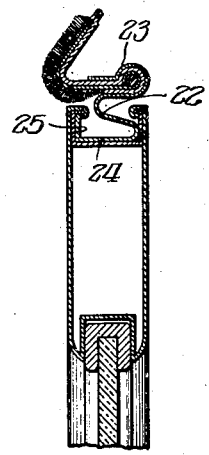
Inventor:
John F. Levan,
By Cromwell, Greist + Warden
attys.

Patented Nov. 17, 1931

1,832,225

UNITED STATES PATENT OFFICE

JOHN F. LEVAN, OF ELKHART, INDIANA, ASSIGNOR TO THE ADLAKE COMPANY, OF CHICAGO, ILLINOIS, A CORPORATION, OF ILLINOIS

WEATHER STRIP

Application filed October 6, 1928. Serial No. 310,767.

The present invention has to do with weather strips, and is concerned particularly with a weather strip which is adapted to be attached to the top rail of a vertically slidable sash to coact with the header of the frame of the sash.

The principal object of the invention is to provide an improved top rail weather strip which is inexpensive to construct, is easy to apply, produces a weather-tight closure when the sash to which it is applied is down, and will maintain its efficiency throughout a long period of time.

Other objects and advantages of the invention will be evident to those skilled in the art upon a full understanding of the construction, arrangement and operation of the improved weather strip.

Two slightly different forms of the invention are presented herein for the purpose of exemplification, but it will of course be appreciated that the invention is susceptible of embodiment in other structurally modified forms coming equally within the scope of the claims.

In the accompanying drawings:

Fig. 1 is a vertical section through a car window frame, showing the weather strip of the invention applied to the top rail of the sash;

Fig. 2 is a similar but fragmentary vertical section, showing the same form of weather strip in coaction with a straight as distinguished from curved header; and Fig. 3 is a fragmentary vertical section through the top rail of a grooved sash, showing a modified form of the weather strip applied thereto.

The assembly shown in Fig. 1 includes a car window frame, a sash which is slidable vertically in the frame, and a weather strip which is mounted on the sash. The weather strip is a composite channel-shaped structure of generally V-shaped cross section. One flange of the weather strip is clamped tightly against the upper face 10 of the top rail 11 of the sash by means of screws 12, with the curved back of the weather strip projected laterally beyond the adjacent side face 13 of the top rail into sealed engagement with the opposed face 14 of the header 15 of the window frame.

The weather strip is made up of a channel strip 16 of spring metal, a flexible outer covering 17 of a pile fabric such as ordinary carpeting material, a flexible inner covering 18 of a lighter material such as pantasote, and a reinforcing rod 19 about which the edge of the horizontal flange of the strip 16 is bent. The outer and inner coverings 17 and 18 are sewed together along their upper edges over the upper edge of the projecting flange of the strip 16, and are clamped against the opposite faces of the horizontal flange of the strip by means of the previously mentioned positioning screws 12 and interposed washers 20.

When the sash is moved downwardly into its closed position, the weather strip engages with the header of the window frame and the curved portion of the spring strip yields resiliently to conform with the curved face of the header with which it comes into contact. The flexible outer covering on the spring strip forms a soft yielding pad between the strip and the header and compensates for any slight irregularities of either of those members, thus effecting a weather-tight closure. The flexible inner covering serves to hold the outer covering in proper position at all times with respect to the spring strip.

A top rail weather strip constructed in accordance with the invention produces an excellent seal between the top rail of a sash and the header of the associated sash frame regardless of slight differences found in the relative positions of the top rail and the header in different window constructions when the sash is down.

In Fig. 2 the same form of weather strip is shown in coaction with a header 21 having a straight, as distinguished from curved, sealing faces.

In Fig. 3 is shown a modified form of the weather strip as applied to a recessed top rail. The structure of the weather strip itself is the same, but the horizontal flange of the weather strip, instead of being clamped directly against the upper surface of the top rail, is supported in slightly spaced relation thereto by means of a supplemental spring strip 22. The strip 22 has a reversely bent upper portion 23 which clamps about the horizontal flange of the weather strip, and has a base portion 24 which is so shaped as to fit tightly within the groove 25 in the top rail of the sash. This construction renders the weather strip resiliently yieldable, not only in part, but as a unit.

I claim:

1. A top rail weather strip consisting of a strip of spring metal having one portion which is adapted to be connected to the top rail of a sash and another portion which is resiliently yieldable with respect to said connecting portion and is adapted to engage with the header of the sash frame, a flexible covering of compressible material on one face of said engaging portion of the strip, and another flexible covering on the opposite face of said engaging portion connected with the first mentioned covering for holding the same in proper position with respect to the strip.

2. A top rail weather strip consisting of a channel strip of spring metal having one portion which is adapted to be attached to the top rail of a sash and another portion which is resiliently yieldable with respect to said attaching portion and is adapted to engage with the header of the sash frame, a flexible covering of pile fabric on one face of said engaging portion of the strip, and another flexible covering of pantasote on the opposite face of said engaging portion attached to the edge of the pile fabric for holding the same in proper position against the engaging portion of the strip.

3. A top rail weather strip consisting of a channel strip of spring metal, a reinforcing rod about which the edge of one flange of the strip is bent, and a flexible covering of pile fabric on the outer face of the base of the channel in the strip.

4. A top rail weather strip consisting of a strip of spring metal, a reinforcing rod about which one edge of the strip is bent, and another supporting strip of spring metal which engages with the first mentioned strip about the bent edge thereof and is adapted to be fastened to the top rail of a sash.

5. In sash construction, a sash frame, a sash which is slidable vertically in the frame, and a padded spring weather strip of channel formation, one side of which is secured to the top rail of the sash, and the back of which projects laterally from the top rail of the sash into engagement with the header of the sash frame.

6. A top rail weather strip consisting of a strip of spring metal, a reinforcing rod about which one edge of the strip is bent, and a flexible covering of compressible material on one face of the strip.

7. In sash construction, the combination with a vertically slidable sash, of a top rail weather strip consisting of a transversely bent strip of spring metal, which strip is characterized by a lower attaching portion and an upper sealing portion, a connection between the lower portion of the strip and the top rail of the sash, a flexible covering of sealing material positioned in front of the upper portion of the strip, a connection between the lower portion of the covering and the lower portion of the strip, and means connected with the upper portion of the covering for maintaining the latter in proper relation to the upper portion of the strip.

In testimony whereof I have hereunto subscribed my name.

JOHN F. LEVAN.